United States Patent
Hur et al.

(10) Patent No.: US 10,446,020 B2
(45) Date of Patent: Oct. 15, 2019

(54) REMOTE CONTROL APPARATUS AND CONTROL METHOD THEREOF

(71) Applicant: SAMSUNG ELECTRONICS CO., LTD., Suwon-si (KR)

(72) Inventors: Jae-myung Hur, Seongnam-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 15/624,997

(22) Filed: Jun. 16, 2017

(65) Prior Publication Data

US 2018/0040239 A1 Feb. 8, 2018

(30) Foreign Application Priority Data

Aug. 4, 2016 (KR) .................. 10-2016-0099340

(51) Int. Cl.
*G08C 23/04* (2006.01)
*G06F 3/023* (2006.01)
(Continued)

(52) U.S. Cl.
CPC .............. *G08C 23/04* (2013.01); *G06F 3/023* (2013.01); *G06F 3/0489* (2013.01);
(Continued)

(58) Field of Classification Search
CPC ................ G08C 23/04; G08C 2201/71; G08C 2201/92; G08C 2201/20; G08C 2201/70; G08C 2201/30; G08C 2201/32
See application file for complete search history.

(56) References Cited

U.S. PATENT DOCUMENTS 5,108,171 A * 4/1992 Spaulding ............... G09F 19/22
                                                  352/100
5,258,867 A   11/1993 Iggulden et al.
(Continued)

FOREIGN PATENT DOCUMENTS

EP    2 892 039 A1    7/2015
JP    2009-253784 A   10/2009
(Continued)

OTHER PUBLICATIONS

International Search Report and Written Opinion dated Nov. 8, 2017 by the International Searching Authority in counterpart International Application No. PCT/KR2017/007808 (PCT/ISA/210 & PCT/ISA/237).
(Continued)

*Primary Examiner* — Tanya T Motsinger
(74) *Attorney, Agent, or Firm* — Sughrue Mion, PLLC

(57) ABSTRACT

A remote control apparatus for controlling a plurality of electronic apparatuses, including an infrared (IR) signal receiver configured to receive an IR signal from among a plurality of IR signals radiated by the plurality of electronic apparatuses, the IR signal being radiated by an electronic apparatus, from among the plurality of electronic apparatuses, which is present in an orientation direction of the remote control apparatus, and a processor configured to, in response to the IR signal being received, identify the electronic apparatus based on the IR signal, and control the input interface to provide a user interface (UI) for controlling the electronic apparatus.

19 Claims, 8 Drawing Sheets

(51) Int. Cl.
*G06F 3/0488* (2013.01)
*G06F 3/0489* (2013.01)

(52) U.S. Cl.
CPC ...... *G06F 3/04886* (2013.01); *G08C 2201/20* (2013.01); *G08C 2201/30* (2013.01); *G08C 2201/92* (2013.01)

(56) References Cited

U.S. PATENT DOCUMENTS

| | | | | |
|---|---|---|---|---|
| 7,110,678 | B2 * | 9/2006 | Willebrand | H04B 10/1123 398/115 |
| 7,397,792 | B1 * | 7/2008 | Beshai | H04L 12/56 370/355 |
| 7,756,141 | B1 * | 7/2010 | Beshai | H04L 47/10 370/400 |
| 9,892,623 | B2 * | 2/2018 | Wu | G02B 23/04 |
| 10,176,710 | B1 * | 1/2019 | Wu | G02B 23/04 |
| 2007/0043453 | A1 * | 2/2007 | Buil | G08C 19/28 700/65 |
| 2010/0013695 | A1 * | 1/2010 | Hong | G08C 17/02 341/176 |
| 2010/0277653 | A1 * | 11/2010 | Liao | G08C 23/04 348/734 |
| 2012/0135692 | A1 * | 5/2012 | Feri | G08C 17/02 455/67.14 |
| 2013/0051806 | A1 | 2/2013 | Quilici et al. | |
| 2013/0271659 | A1 * | 10/2013 | Na | H04N 5/4403 348/563 |
| 2015/0194050 | A1 * | 7/2015 | Lee | G08C 17/02 340/12.22 |
| 2016/0091704 | A1 | 3/2016 | Hoke et al. | |
| 2017/0162036 | A1 * | 6/2017 | Agardh | G08C 17/02 |
| 2017/0211993 | A1 * | 7/2017 | Larsen | G01J 5/0868 |
| 2017/0366778 | A1 * | 12/2017 | Kim | H04N 21/4312 |
| 2018/0012485 | A1 * | 1/2018 | Park | G08C 23/04 |
| 2018/0053402 | A1 * | 2/2018 | Woodard | G08C 23/04 |
| 2018/0217677 | A1 * | 8/2018 | Penning De Vries | G08C 17/00 |

FOREIGN PATENT DOCUMENTS

| | | |
|---|---|---|
| KR | 20-2009-0002686 U | 3/2009 |
| KR | 10-2011-0139310 A | 12/2011 |
| KR | 10-1233783 B1 | 2/2013 |
| WO | 2005/121937 A2 | 12/2005 |
| WO | 2011/027957 A1 | 3/2011 |
| WO | 2012/005716 A1 | 1/2012 |

OTHER PUBLICATIONS

Communication dated Jan. 2, 2018 by the European Patent Office in counterpart European Patent Application No. 17175660.4.
Communication dated Apr. 17, 2019 issued by the European Patent Office in counterpart European Patent Application No. 17175660.4.

* cited by examiner

REMOTE CONTROL APPARATUS AND CONTROL METHOD THEREOF

CROSS-REFERENCE TO RELATED APPLICATIONS

This application claims priority from Korean Patent Application No. 10-2016-0099340, filed in the Korean Intellectual Property Office on Aug. 4, 2016, the disclosure of which is incorporated herein by reference in its entirety.

BACKGROUND

1. Field

Apparatuses and methods consistent with exemplary embodiments relate to a remote control apparatus and a control method thereof, and more particularly, to a remote control apparatus capable of controlling a plurality of electronic apparatuses and a control method thereof.

2. Description of Related Art

As the number of types of home appliances has increased, a remote control apparatus such as a multi-brand remote (MBR) controller has become broadly used. Using such an MBR controller, a user can control operations of various home appliances such as a television, lighting, an air conditioner, etc. with only a single remote control apparatus, providing the user with increased convenience.

In existing remote control apparatuses for controlling various electronic apparatuses, a user selects an electronic apparatus to be controlled on the remote control apparatus. Therefore, whenever the user desires to change an electronic apparatus to be controlled, the user must make a new selection on the remote control apparatus, which causes an inconvenience to the user.

Accordingly, there exists a need for a method for conveniently controlling an electronic apparatus to be controlled without a process of manually selecting an electronic apparatus to be controlled by a user.

SUMMARY

Apparatuses and methods consistent with exemplary embodiments relate to a remote control apparatus for more conveniently controlling a plurality of electronic apparatuses and a control method thereof.

According to an aspect of an exemplary embodiment, a remote control apparatus for controlling a plurality of electronic apparatuses includes an infrared (IR) signal receiver configured to receive an IR signal from among a plurality of IR signals radiated by the plurality of electronic apparatuses, the IR signal being radiated by an electronic apparatus, from among the plurality of electronic apparatuses, which is present in an orientation direction of the remote control apparatus, and a processor configured to, in response to the IR signal being received, identify the electronic apparatus based on the IR signal, and control the input interface to provide a user interface (UI) for controlling the electronic apparatus.

The IR signal receiver may include a reflective surface having a parabolic shape, the IR signal receiver being configured to receive the IR signal incident on a focal point of the reflective surface from the electronic apparatus.

The remote control apparatus may further include an IR signal transmitter, and the processor may be further configured to identify the electronic apparatus based on apparatus identification information included in the IR signal, control the input interface to provide a control command key set corresponding to the identified electronic apparatus, and in response to a control command which is input on the input interface, control the IR signal transmitter to transmit the control command to the identified electronic apparatus.

The remote control apparatus may further include a communication interface, and the processor may be further configured to, in response to a predetermined event being detected, control the communication interface to transmit an operation preparation signal to at least one of the plurality of electronic apparatuses, wherein the operation preparation signal controls the IR signal to be radiated at a predetermined interval.

The remote control apparatus may further include a motion sensor, and the processor may be further configured to, in response to a movement being sensed by the motion sensor, control the communication interface to transmit the operation preparation signal.

The input interface may further include a touch display configured to receive a touch input, and the processor may be further configured to control the touch display to display a graphical user interface (GUI) including the control command key set, and wherein the control command corresponds to a key of the control command key set for which the touch input is performed in the GUI.

The input interface may include at least one physical button, and the processor may be further configured to map the control command key set to the at least one physical button.

The remote control apparatus may further include a storage configured to store an IR code table including a plurality of control command key sets corresponding to identification information of the plurality of electronic apparatuses, and the processor may be further configured to control the input interface to provide the control command key set corresponding to the identified electronic apparatus based on the stored IR code table.

The processor may be further configured to control the communication interface to transmit, to the plurality of electronic apparatuses, a control command for controlling respective IR signal radiation periods of each of the plurality of electronic apparatuses based on at least one of a time of use of the plurality of electronic apparatuses or a frequency of use of each of the plurality of electronic apparatuses.

A portion of the reflective surface may be non-reflective to IR signals due to at least one from among a shape of the portion, a material from which the portion is constructed, and a material coating the portion.

According to an aspect of another exemplary embodiment, a controlling method of a remote control apparatus for controlling a plurality of electronic apparatuses includes receiving an infrared (IR) signal from among a plurality of IR signals radiated by the plurality of electronic apparatuses, the IR signal being radiated by an electronic apparatus, from among the plurality of electronic apparatuses, which is present in an orientation direction of the remote control apparatus, in response to the receiving the IR signal, identifying the electronic apparatus based on the IR signal, and providing a user interface (UI) for controlling the electronic apparatus.

The remote control apparatus may include a reflective surface having a parabolic shape, and the IR signal may be incident on a focal point of the reflective surface.

The identifying the electronic apparatus may include identifying the electronic apparatus based on apparatus identification information included in the IR signal, the providing the UI may include providing a control command key set corresponding to the identified electronic apparatus, and the controlling method may further include receiving a control command corresponding to the control command key set, and transmitting the control command to the identified electronic apparatus.

The controlling method may further include, in response to an event being detected, transmitting an operation preparation signal to at least one of the plurality of electronic apparatuses, wherein the operation preparation signal controls the IR signal to be radiated at a predetermined interval.

The event may include a predetermined movement of the remote control apparatus being sensed by a motion sensor.

The providing the UI may include displaying, on a touch display, a graphical interface (GUI) including the control command key set, and the control command may correspond to a key of the control command key set for which a touch input is performed in the GUI.

The control command key set may be mapped to at least one physical button on the remote control apparatus.

The controlling method may further include storing an IR code table including control command key sets corresponding to identification information of the plurality of electronic apparatuses, and the providing the control command key set may include providing the control command key set based on the stored IR code table.

The controlling method may further include transmitting, to the plurality of electronic apparatuses, a control command for controlling respective IR signal radiation periods of each of the plurality of electronic apparatuses based on at least one of a time of use or a frequency of use of each of the plurality of electronic apparatuses.

A portion of the reflective surface may be non-reflective to IR signals due to at least one from among a shape of the portion, a material from which the portion is constructed, and a material coating the portion.

According to another aspect of an exemplary embodiment, a controlling method of a remote control apparatus for controlling a plurality of electronic apparatuses includes orienting the remote control apparatus in an orientation direction, receiving an infrared (IR) signal from among a plurality of IR signals radiated by the plurality of electronic apparatuses, the IR signal being radiated by an electronic apparatus of the plurality of electronic apparatuses, the electronic apparatus being present in the orientation direction, identifying the electronic apparatus based on the IR signal, and providing a user interface for controlling the electronic apparatus.

The orientation direction may include a direction in which the IR signal radiated by the electronic apparatus is incident on the remote control apparatus parallel to an axis of a reflective parabolic surface of the remote control apparatus.

The IR signal may be incident parallel to the axis of the reflective parabolic surface when the IR signal is incident on the reflective parabolic surface within a predetermined angle of the axis.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
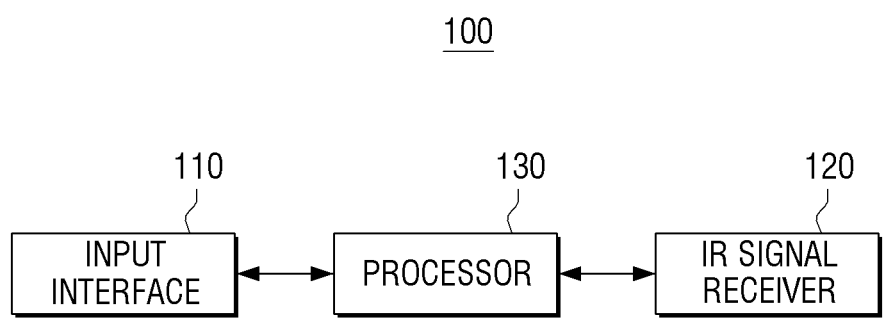
FIG. 1 is a block diagram illustrating a configuration of a remote control apparatus according to an exemplary embodiment.

Exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail as they may obscure the disclosure with unnecessary detail.

The terms used in the present specification are general terms selected in consideration of the functions of various exemplary embodiments of the present disclosure. However, these terms may vary depending on intention, legal or technical interpretation, emergence of new technologies, and the like of those skilled in the related art. Further, some of the terms may be arbitrarily selected. Unless a specific definition of a term is provided, the term may be construed based on the overall contents and technological common sense of those skilled in the related art.

Further, like reference numerals generally indicate like components that perform substantially the same functions throughout the specification. For the sake of explanation and understanding, different exemplary embodiments are described with reference to like reference numerals. That is, even if all the components in the plurality of drawings have like reference numerals, it does not mean that the plurality of drawings refer to only one exemplary embodiment.

Further, the terms including numerical expressions such as "a first," "a second," and the like may be used to explain various components, but there is no limitation thereto. These terms are used only for the purpose of differentiating one component from another, without limitation thereto. For example, a numerical expression combined with a component does not limit the order of use or order of arrangement of the component. When necessary, the numerical expressions may be exchanged between components.

The singular expression also includes the plural meaning, as long as this does not change the context. In this specification, terms such as "comprise", "include" and "have/has" should be construed as designating that there are such characteristics, numbers, operations, elements, components or a combination thereof in the specification, not to exclude the existence or possibility of adding one or more of other characteristics, numbers, operations, elements, components or a combination thereof.

In exemplary embodiments of the present disclosure, terms such as "module," "unit," "part," and the like are terms used to indicate components that perform at least one function and operation, and these components may be realized in hardware, software or in combination thereof. Further, except for when each of a plurality of "modules," "units," "parts," and the like needs to be present in an individual hardware, the components may be integrated in at least one module or chip and be realized in at least one processor.

Further, in exemplary embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component.

Hereinafter, exemplary embodiments will be explained with reference to the drawings.

FIG. 1 is a block diagram illustrating a configuration of a remote control apparatus according to an exemplary embodiment.

According to an exemplary embodiment, a remote control apparatus 100 is capable of controlling a plurality of electronic apparatuses. The remote control apparatus 100 may be a multi-brand remote (MBR) controller, a smart phone, a cell phone, etc. The remote control apparatus 100 may be various apparatuses including a physical button which is capable of controlling a plurality of electronic apparatus by the MBR controller or a smart phone.

An input interface 110 can receive a user command for controlling an electronic apparatus. Specifically, the input interface 110 may be at least one button which is mapped with a function for controlling the electronic apparatus or a plurality of different electronic apparatuses. The controlling function may indicate a function for performing an operation corresponding to a control command corresponding to each of the electronic apparatuses. For example, if the electronic apparatus to be controlled is a television (TV), the controlling function may include changing a channel, turning the volume up or down, etc., and respective controlling functions according thereto may be mapped. In addition, if the electronic apparatus to be controlled is an air conditioner, the controlling function may include increasing or decreasing the temperature, scheduling a time, etc., and respective controlling functions according thereto may be mapped in the button.

According to an exemplary embodiment, input interface 110 may a touch display which receives a touch input. If the input interface 110 is the touch display, the input interface 110 may receive a control command by a touch by a finger or a touch pen. In this case, the touch display may include a display panel which displays information outputted from the remote control apparatus 100 and an input sensing panel which operates an input function corresponding to a touch by a user.

The display panel may a liquid crystal display (LDC) or an organic light emitting diodes (OLED) display, and may be structurally integrated with the input sensing panel. The display panel may display various graphical user interfaces (GUIs) corresponding to various operation states, a menu state, an application execution state and a service, etc., including a virtual button capable of controlling the remote control apparatus 100.

The input sensing panel may sense various inputs such as a single touch input, multiple touch inputs, a drag input, a hand-writing input, a drawing input, etc. by a finger or various objects such as an electronic pen, etc. by a user. The input sensing panel may be a single panel which is capable of sensing both a finger input and a pen input, or may be two panels, for example a touch panel capable of sensing a finger input and a pen recognition panel capable of sensing a pen input.

An IR signal receiver 120 may receive IR signals radiated by a plurality of electronic apparatuses. Herein, when the plurality of electronic apparatuses radiate IR signals in all directions, the IR signal receiver 120 may receive only an IR signal radiated by an electronic apparatus which is present in the direction that the remote control apparatus 100 is oriented, for example by using a reflective surface having a parabolic shape.

Specifically, the IR signal receiver 120 may receive only an IR signal which is radiated toward the focal point of the reflective surface from the electronic apparatus which is present in the direction that the remote control apparatus 100 is oriented. Herein, the direction that the remote control apparatus 100 is oriented may refer to a direction in which the IR signal radiated in all directions by the electronic apparatus is incident parallel to the axis of the reflective surface of the remote control apparatus 100 or within a predetermined angle when the IR signal radiated in all directions by the electronic apparatus to be controlled. For example the predetermined angle may be 15 degrees to 20 degrees, or any other angle as desired.

The IR signal receiver 120 may include a reflective surface having a parabolic shape, such as a parabolic antenna, and may reflect an IR signal radiated from the electronic apparatuses subject to control. The remote control apparatus 100 may receive an IR signal incident parallel to the axis of the reflective surface of the remote control apparatus 100 from among IR signals radiated from an electronic apparatus in the direction that the remote control apparatus 100 is oriented, because only an IR signal incident parallel to the reflective surface is incident to the focal point by being reflected by the reflective surface.

The IR signal receiver 120 may include a receiver which receives an IR signal at the focal point of the reflective surface and may receive only an IR signal which is directly incident on the located receiver or an IR signal which is incident by being reflected by the reflective surface. The IR signal may be received, for example, when the intensity of the IR signal received through the receiver is equal to or greater than a predetermined intensity.

A processor 130 may control overall operation of the remote control apparatus 100. Specifically, the processor 130 may, in response to an IR signal being received, identify an electronic apparatus based on the IR signal, and provide a UI for controlling the electronic apparatus through the input interface 110. Each of the electronic apparatuses may transmit IR signals including apparatus identification information of the electronic apparatuses, respectively, and the processor 130 may identify an electronic apparatus based on the apparatus identification information included in an IR signal.

The processor 130 may provide a control command key set corresponding to the identified electronic apparatus through the input interface 110, and may transmit a control command which is input corresponding to the control command key set provided on the input interface 110 to the identified electronic apparatus through an IR signal transmitter 140. The control command key set may include mapping information including all control commands by which the identified electronic apparatus can be controlled and which are mapped to at least one key.

In the case in which the input interface 110 is a touch display which receives a touch input, the processor 130 may display a GUI including the control command key set corresponding to the identified electronic apparatus on the touch display, and may transmit to the identified electronic apparatus, a control command corresponding to a key for which a touch input is performed in the control command key set included in the GUI. For example, the GUI including the control command key set may be displayed as at least one virtual button.

In the case in which the input interface 110 is at least one physical button, the processor 130 may map a control command key set corresponding to the identified electronic apparatus to at least one button. Accordingly, the at least one button may be mapped with different functions corresponding to the identified electronic apparatus.

According to an exemplary embodiment, the remote control apparatus 100 may further include a storage 160 which stores an IR code table including control command key sets corresponding to identification information of a plurality of respective electronic apparatuses. Herein, the IR code table may indicate apparatus identification information which is distinguished according to a manufacturer and a model, etc. of an electronic apparatus, and information matching the apparatus identification information to a corresponding control command key set. Based on the apparatus identification information included in the received IR signal, the processor 130 may search for a control command key set corresponding to the apparatus identification information in the IR code table stored in the storage 160 and provide the searched control command key set through the input interface 110.

Figure 2:
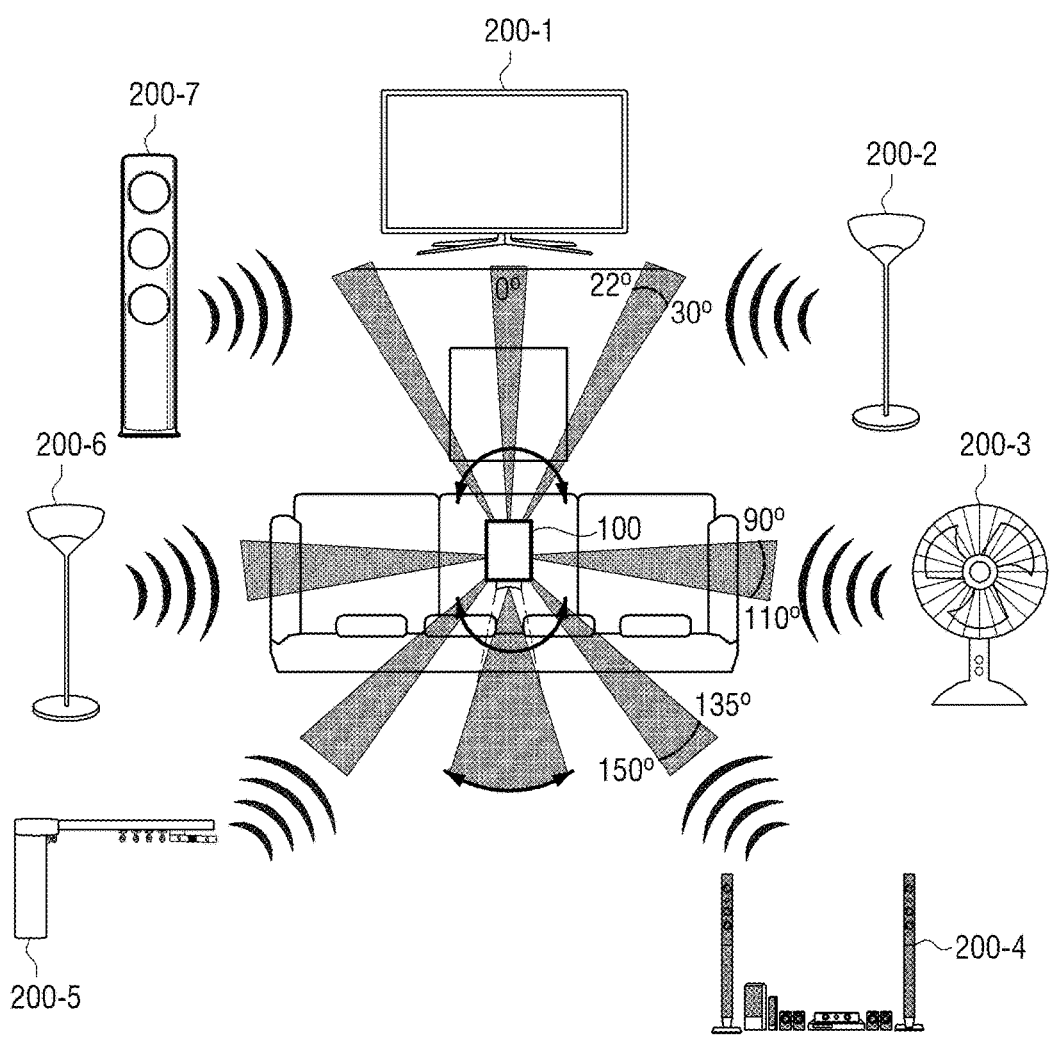
FIG. 2 is a schematic diagram illustrating a remote control apparatus in a home and a control system according to an exemplary embodiment.

FIG. 2 is a schematic diagram illustrating a remote control apparatus in a home and a control system thereof according to an exemplary embodiment.

Referring to FIG. 2, if a user desires to control electronic apparatuses such as a television (TV) 200-1, living room lighting 200-2, 200-6, a fan 200-3, a home theater 200-4, kitchen lighting 200-5, an air conditioner 200-7, etc., the user may use the remote control apparatus 100, which can control all the electronic apparatuses. Herein, the remote control apparatus 100 may receive IR signals radiated in all directions from each of the plurality of electronic apparatuses 200-1, 200-2, 200-3, 200-4, 200-5, 200-6, 200-7. The plurality of electronic apparatuses 200-1, 200-2, 200-3, 200-4, 200-5, 200-6, 200-7 may radiate IR signals including apparatus identification information at predetermined intervals.

The user may be provided with a UI for controlling an electronic apparatus on the input interface by pointing to the electronic apparatus that the user desires to control with the remote control apparatus 100. For example, if the user orients the remote control apparatus 100 toward the TV 200-1, an IR signal oriented to the remote control apparatus 100 among IR signals radiated from the TV 200-1 may be received by a receiver which is located at the focal point by being reflected by a reflective surface having a parabolic shape of the IR signal receiver 120.

The processor 130 may identify the electronic apparatus based on apparatus identification information included in the received IR signal, and in response to the identified electronic apparatus being determined as the TV 200-1, a UI corresponding to the TV 200-1 may be provided through the input interface 110, and the user may input a control command for controlling the TV 200-1 through the input interface 110 on which the UI is provided.

Figure 3A:
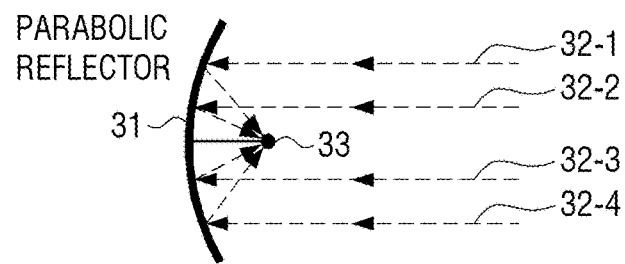
FIGS. 3A and 3B illustrate a structural characteristic of a reflective surface having a parabolic shape of an IR signal receiver according to an exemplary embodiment.
Figure 3B:
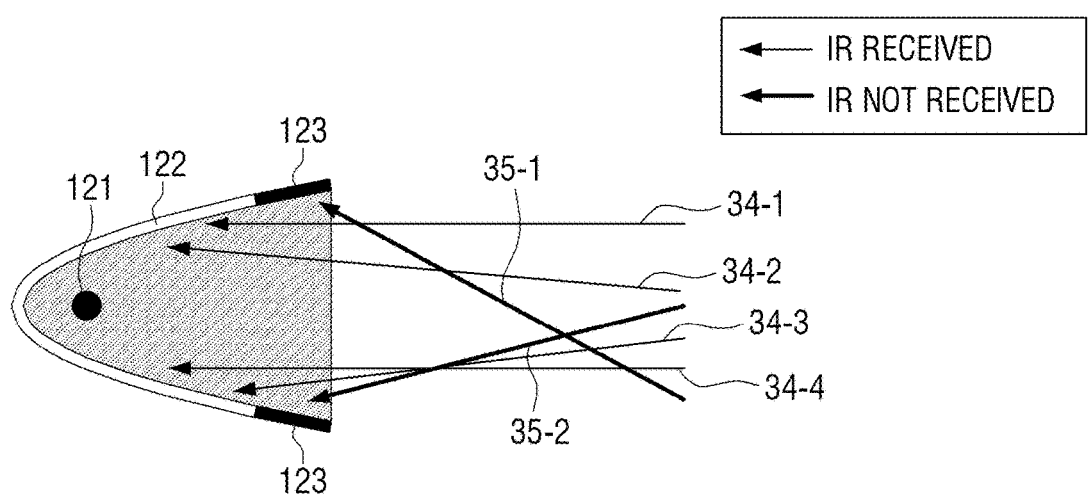

FIGS. 3A and 3B illustrate a structural characteristic of a reflective surface having a parabolic shape of an IR signal receiver according to an exemplary embodiment.

As illustrated in FIG. 3A, IR signals 32-1, 32-2, 32-3, 32-4 are incident parallel to the inside of a reflective surface 31, which has a parabolic shape, may be reflected by the reflective surface regardless of incident points and gathered to a focal point 33 of the reflective surface 31. As illustrated in FIG. 3B, by forming the IR signal receiver 120 to have the reflective surface 122 having a parabolic shape, only an IR signal which is incident parallel to the axis of the reflective surface 122, from an electronic apparatus that the remote control apparatus is oriented may be received. According to an exemplary embodiment, an IR signal may be considered incident parallel to the axis of the reflective surface 122 if the IR signal is incident within a predetermined angle range with respect to the axis of reflective surface 122.

A plurality of IR signals 34-1, 34-2, 34-3, 34-4, 35-1, 35-2 may be incident on the IR signal receiver 120. Herein, as illustrated in FIG. 3B, the IR signals radiated from the electronic apparatus located in the direction that the remote control apparatus 100 is oriented may be the IR signals 34-1, 34-2, 34-3, 34-4 in the predetermined angle range based on the axis of the reflective surface 122, and the IR signals 34-1, 34-2, 34-3, 34-4 may be incident on the focal point 121 by being reflected by the reflective surface 122. However, IR signals radiated from an electronic apparatus located in a direction that is different from the direction that the remote control apparatus 100 is oriented may be the IR signals 35-1, 35-2 which are out of the angle range predetermined based on the axis of the reflective surface 122, and the IR signals 35-1, 35-2 are not incident on the focal point 121 by being reflected by the reflective surface 122.

IR signals incident on an outermost part of the reflective surface 122 may be incident on the focal point by being continuously reflected even though the IR signals are not parallel to the axis of the reflective surface 122 and such cases degrade the accuracy. Therefore, according to an exemplary embodiment, a part of the reflective surface 122 of the IR signal receiver 120 may be formed in an IR signal non-reflective shape, that is, a shape which does not reflect IR signals, or made of IR signal non-reflective materials, that is, materials which do not reflect IR signals. In some exemplary embodiments, a part, for example outermost part 123, of the reflective surface 122 may be coated with an IR signal non-reflective material.

According to an exemplary embodiment illustrated in FIG. 3B, the outermost part 123 of the reflective surface may be formed in an uneven surface or a rough surface in order to not reflect an IR signal, or may be formed by plastic materials which cannot reflect an IR signal. In some exemplary embodiments, an IR non-reflective material may be coated on the outermost part 123 of the reflective surface and thus, decreased accuracy caused by continuous reflection may be minimized.

Figure 4:
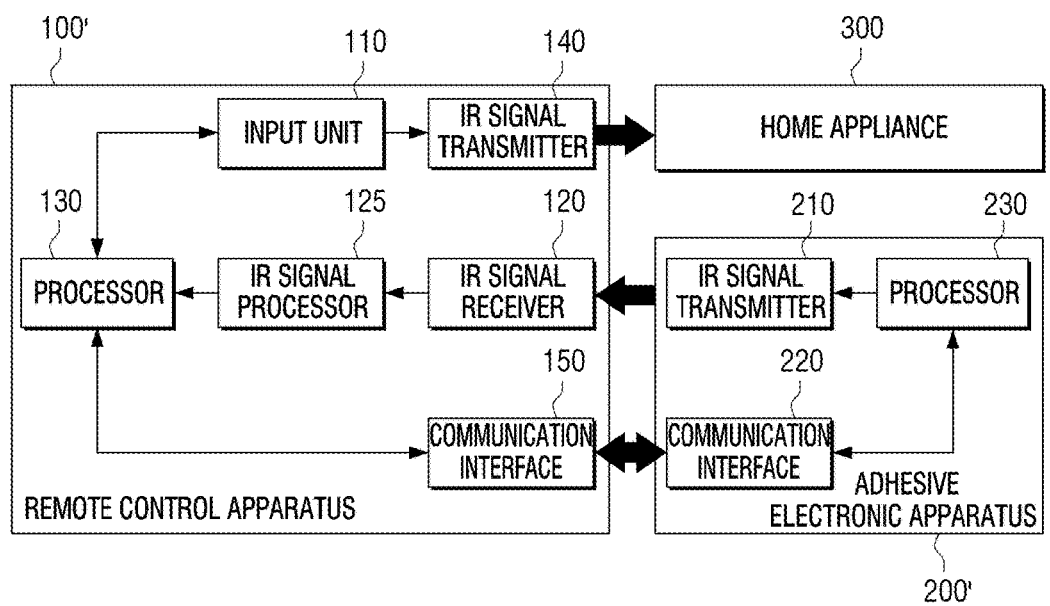
FIG. 4 illustrates a remote control operation process of a remote control apparatus and an electronic apparatus according to another exemplary embodiment.

FIG. 4 illustrates a remote control operation process of a remote control apparatus and an electronic apparatus according to another exemplary embodiment.

FIG. 4 illustrates a remote control apparatus 100' composing a remote control system, including the input interface 110, the IR signal receiver 120, an IR signal processor 125, the processor 130, the IR signal transmitter 140, and a communication interface 150. As illustrated in FIG. 4, an electronic apparatus 200' may be an apparatus which can be attached to and detached from a home appliance 300 as a separate apparatus. The electronic apparatus 200' may include an IR signal transmitter 210, a communication interface 220 and a processor 230. Hereinafter, detailed descriptions regarding the configurations repetitive to those of FIG. 1 are omitted.

The processor 230 of the electronic apparatus 200' may control the IR signal transmitter 210 to radiate IR signals at predetermined intervals in all directions. In order to save power, the electronic apparatus 200' may be operated in a standby mode in which only the communication interface 220 is in an active state in which power is supplied, and the rest of the components are maintained in an inactivated state in which power supply is limited In response to a certain signal being received from the remote control apparatus 100', the mode may be changed to an operation mode, and IR signals may be radiated at predetermined intervals.

The remote control apparatus 100' may the include communication interface 150, and the electronic apparatus 200' may include communication interface 220. The processor 130 may, in response to a predetermined event being sensed, transmit, to at least one of plurality of electronic apparatuses, an operation preparation signal for controlling IR signals to be radiated through the communication interface 150 at predetermined intervals. If the remote control apparatus 100' transmits the operation preparation signal instructing IR signals to be radiated at the predetermined intervals through the communication interface 150, the communication interface 220 of the electronic apparatus 200' may receive the operation preparation signal, and in response to the operation preparation signal being received, the processor 230 may control the IR signal transmitter 210 to radiate IR signals at the predetermined intervals.

The operation preparation signal may be transmitted to the electronic apparatus 200' corresponding to the occurrence of the predetermined event, and the predetermined event may be a predetermined control command which is input on the input interface 110. The remote control apparatus 100 may further include a motion sensor 180, and the predetermined event may be a motion, for example a predetermined motion sensed by the motion sensor 180. For example, if a user raises the remote control apparatus 100' which was on a table, the user may desire to control any one of a plurality of electronic apparatuses. Therefore, if the motion sensor 180 senses the motion, the processor 130 may transmit the operation preparation signal for changing the standby mode to the operation preparation mode to at least one of the plurality of electronic apparatuses.

According to an exemplary embodiment, motion sensor 180 may be a six-axis sensor including an acceleration sensor and a geomagnetic sensor.

The communication interface 150 and communication interface 220 may be communicate according to various communication types. Specifically, the communication interfaces 150, 220 may communicate through various communication types using radio frequency (RF) such as BLUETOOTH, BLUETOOTH LOW ENERGY (BLE), WI-FI, ZIGBEE, near-field communication (NFC), and the like.

If an IR signal is received from the electronic apparatus 200' through the IR signal receiver 120, the IR signal processor 125 may process the received IR signal, identify the electronic apparatus 200', and search for a control command key set corresponding to the identified electronic apparatus 200'. The processor 130 may provide a searched control command key set to the input interface 110, and if a user input a control command on the input interface 110, the IR signal transmitter 140 may transmit the input control command to the home appliance 300, and the home appliance 300 may be controlled.

Figure 5:
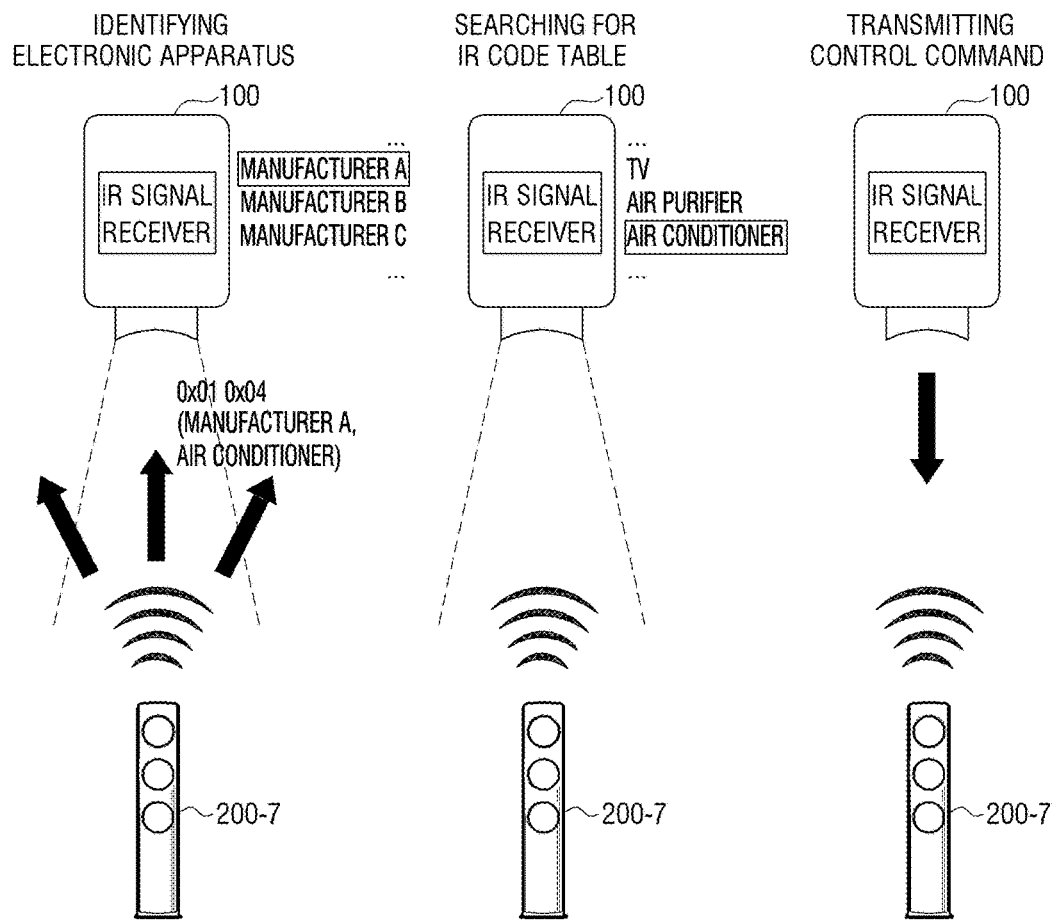
FIGS. 5A, 5B, and 5C illustrates a method of a remote control apparatus for identifying an electronic apparatus according to an exemplary embodiment.

FIGS. 5A, 5B, AND 5C illustrates a method of a remote control apparatus for identifying an electronic apparatus according to an exemplary embodiment.

As illustrated in FIG. 5A, if an object to be controlled is the air conditioner 200-7, in response to the remote control apparatus 100 being oriented by a user in the direction of the air conditioner 200-7, among IR signals radiated by a plurality of electronic apparatuses, only IR signals radiated by the air conditioner 200-7 and incident parallel to the axis of a reflective surface 122 may be received. The remote control apparatus 100 may identify that the electronic apparatus is the air conditioner 200-7 of a certain manufacturer and a certain model by using the apparatus identification information included in the received IR signal.

As illustrated in FIG. 5B, the remote control apparatus 100 may provide a control command key set corresponding to the apparatus identification information to the input interface 110 by searching for an IR code table. If the control command key set is provided to the input interface 110, as illustrated in FIG. 5C, a control command input through the input interface 110 may be transmitted to the air conditioner 200-7.

Figure 6:
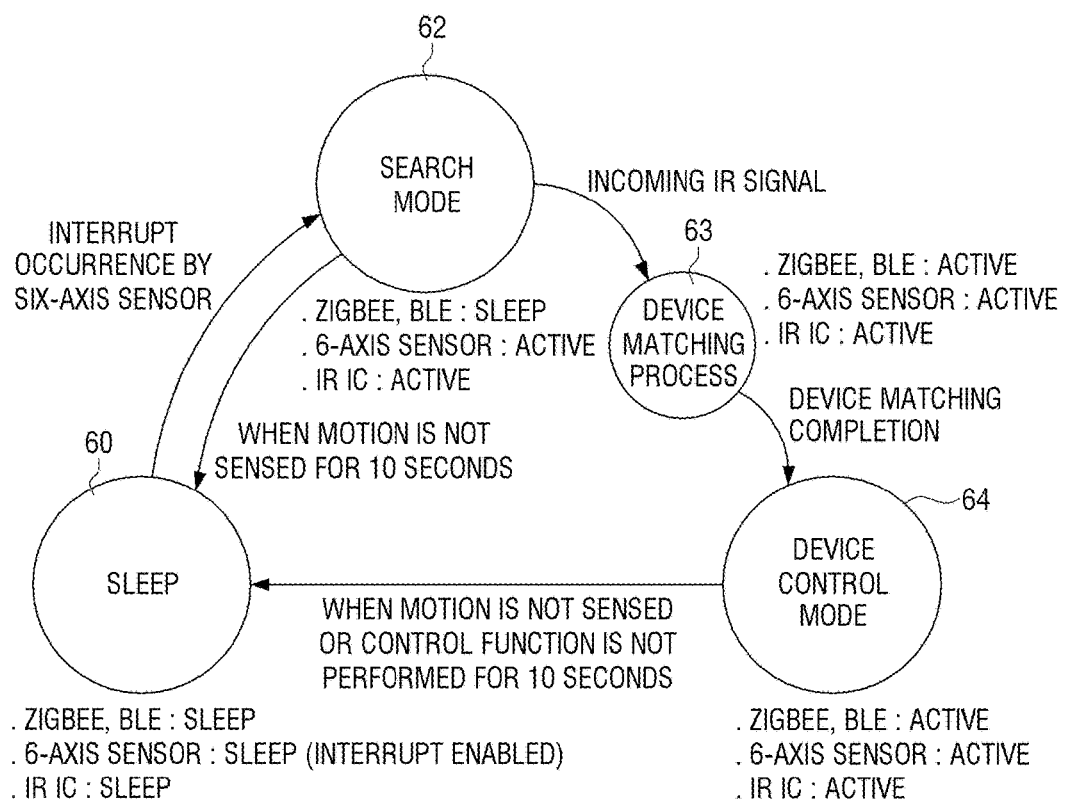
FIG. 6 illustrates an operation mode of a remote control apparatus for power saving of an electronic apparatus according to another exemplary embodiment.

FIG. 6 illustrates an operation mode of a remote control apparatus for power saving of an electronic apparatus according to another exemplary embodiment.

As illustrated in FIG. 6, if the remote control apparatus 100 is in a standby mode 60, the communication interface 150, the motion sensor 180 and the processor 130 may be in an inactivated state in which power supply is limited. If a motion of the remote control apparatus 100 is sensed by the motion sensor 180, the mode of the remote control apparatus 100 may be changed to a search mode 62 and an operation preparation signal may be transmitted with respect to at least one electronic apparatus among a plurality of electronic apparatuses. The electronic apparatus which receives the operation preparation signal may transmit an IR signal including apparatus identification information in all directions. In response to the remote control apparatus 100 receiving the IR signal, the electronic apparatus may be identified based on the apparatus identification information included in the IR signal, and a device matching process 63 for providing a control command key set corresponding to the identified electronic apparatus may be performed. If a device matching is completed, a control mode 64 may be started and a control command input by the user may be transmitted to the electronic apparatus. Herein, in order to save power, if a motion of the remote control apparatus 100 is not sensed or an input control command is not operated more than 10 seconds, the processor 130 may change the mode of the remote control apparatus 100 to the standby mode 60.

The processor 130 may transmit a control command for controlling respective IR signal radiation periods of each of the plurality of electronic apparatuses to be different based on time or frequency of use of each of the plurality of electronic apparatuses, to the plurality of electronic apparatuses through the communication interface 150. For example, the processor 130 may transmit a control command for changing a mode to the standby mode, for example a deep sleep mode, by cutting off the power supplied to the communication interface 220 of an electronic apparatus in the time when an electronic apparatus is less often controlled, such as the early hours of the morning. The processor 130 may identify a use frequency of the plurality of electronic apparatuses, for example an input count of control commands, to set IR signal radiation periods to be relatively longer for an electronic apparatus of which use frequency is low, and to set IR signal radiation periods to be relatively shorter for an electronic apparatus of which use frequency is high.

According to an exemplary embodiment, if the remote control apparatus 100 identifies a certain electronic apparatus, the remote control apparatus 100 may control the communication interface 150 to transmit a control command for changing IR signal radiation periods of other electronic apparatuses to be longer, or a control command for controlling an IR signal not to be radiated to other electronic apparatus.

Figure 7:
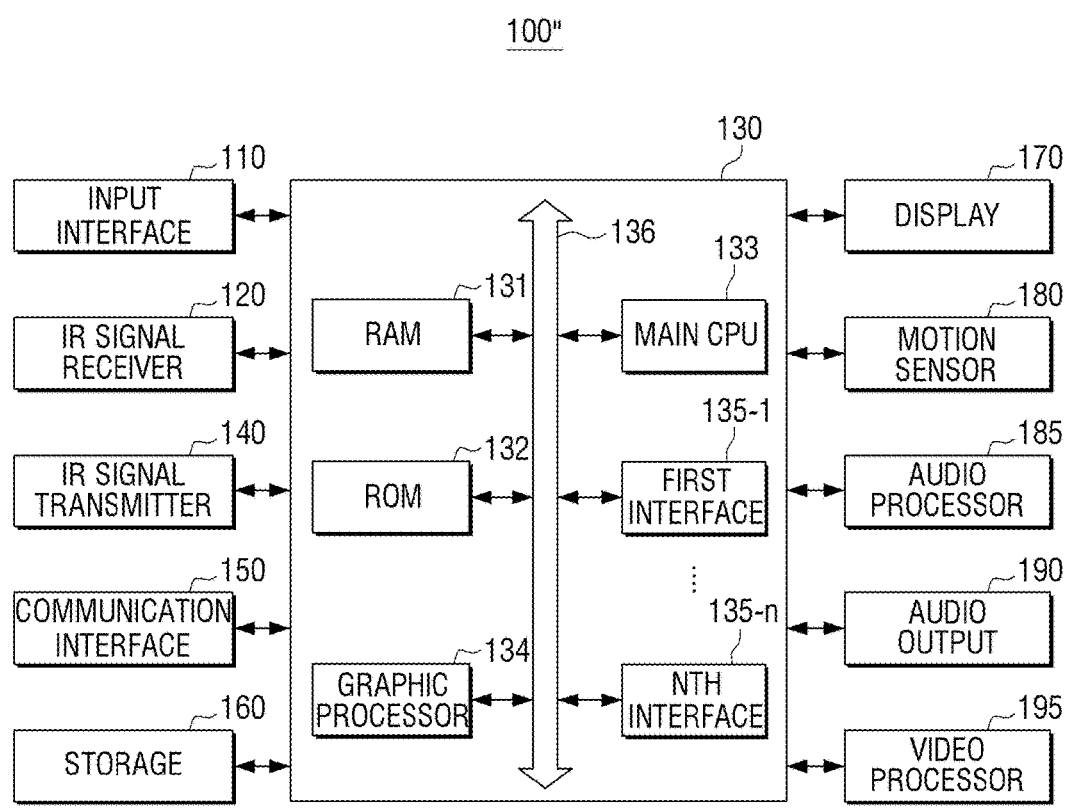
FIG. 7 is a block diagram illustrating a detailed configuration of a remote control apparatus according to another exemplary embodiment.

FIG. 7 is a block diagram illustrating a detailed configuration of a remote control apparatus according to another exemplary embodiment.

FIG. 7 illustrates a remote control apparatus 100" according to an exemplary embodiment, including the input interface 110, the IR signal receiver 120, the processor 130, the IR signal transmitter 140, the communication interface 150, the storage 160, a display 170, the motion sensor 180, an audio processor 185, an audio output interface 190 and a video processor 195. Description repetitive to that of FIGS. 1 and 4 is omitted hereinafter.

The storage 160 may store various modules for driving the remote control apparatus 100".

For example, the storage 160 may further store a base module for processing signals transmitted from respective hardware included in the remote control apparatus 100", a storage module for managing database or registry, a security module, a communication module, etc.

The display 170 may display a GUI for controlling the remote control apparatus 100" and may be a touch display. A detailed configuration thereof may be similar to the configuration described with respect to FIG. 1.

The audio processor 185 may process audio data.

The audio output interface 190 may output audio data processed in the audio processor 185.

The video processor 195 may perform various image processes such as decoding an input image, scaling, noise filtering, frame rate conversion, resolution conversion and the like.

The processor 130 may control overall operation of the remote control apparatus 100" by using various modules stored in the storage 160.

As illustrated in the exemplary embodiment of FIG. 7, the processor 130 includes a RAM 131, a ROM 132, a CPU 133, a graphic processor 134, first through $n^{th}$ interface 135-1~135-$n$, and a bus 136. Herein, the RAM 131, the ROM 132, the CPU 133, the graphic processor 134, and the first through $n^{th}$ interface 135-1~135-$n$ may be connected through the bus 136.

The ROM 132 stores a set of instructions for booting a system, and the like. The CPU 133 copies various application programs stored in the storage 160 in the RAM 131, and performs various operations by executing the application programs copied in the RAM 131.

The graphic processor 134 generates a screen including various types of objects such as an icon, an image, a text, and the like by using an operator and a renderer. The operator may compute values such as coordinates, shape, size, and color of each object to be displayed according to the layout of the screen. The renderer may generate screens of various layouts including objects based on the attribute values calculated by the operator.

The CPU 133 may access the storage 160 and boot an operating system (OS) stored in the storage 160. The CPU 133 may perform various operations using various programs, contents, data, etc. stored in the storage 160.

The first through the $n^{th}$ interfaces 135-1 through 135-$n$ may be connected to the above-described various elements. One of the interfaces may be a network interface connected to an external apparatus via network.

Figure 8:
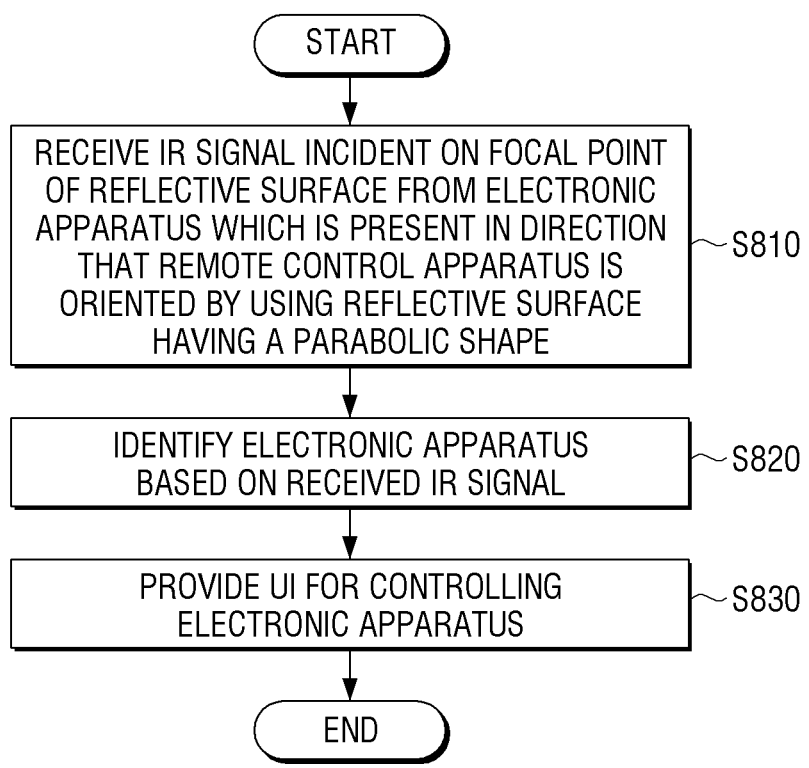
FIG. 8 is a flowchart illustrating a control method of a remote control apparatus according to an exemplary embodiment.

FIG. 8 is a flowchart illustrating a control method of a remote control apparatus according to an exemplary embodiment.

According to the exemplary embodiment of FIG. 8, at operation S810 an IR signal is received by using a reflective surface having a parabolic shape, and the signal is radiated by an electronic apparatus which is present in a direction that the remote control apparatus is oriented among IR signals radiated by a plurality of electronic apparatuses. Herein, the IR signal is received when it is incident on a focal point of the reflective surface from the electronic apparatus which is present in the direction that the remote control apparatus is oriented.

The electronic apparatus is identified based on the received IR signal at operation S820. Herein, the IR signal may include apparatus identification information.

A UI for controlling the electronic apparatus is provided at operation S830. Herein, a control command key set corresponding to the identified electronic apparatus may be provided, and a control command which is input corresponding to the provided control command key set may be transmitted to the identified electronic apparatus.

According to the various exemplary embodiments, a user can more intuitively manipulate various electronic apparatuses and thus the user can control the various electronic apparatuses more conveniently.

The methods of controlling the remote control apparatus 100 according to the above-described example embodiments may be a program, and may be stored in various recording media. For example, a computer program which is processed by various processers to execute the above-described various controlling methods may be stored and used in recording media.

For example, a non-transitory computer readable medium may be provided which stores a computer program which includes the operations of receiving an IR signal radiated by an electronic apparatus which is present in a direction that the remote control apparatus is oriented among IR signals radiated by the plurality of electronic apparatuses, identifying the electronic apparatus based on the IR signal, and providing a UI for controlling the electronic apparatus.

A non-transitory computer readable medium does not include a medium that stores data for a short period of time such as a register, a cache, a memory, and the like, but rather a medium readable by devices and which stores data semi-permanently. For example, various applications and programs as described above may be stored and provided in a non-transitory computer readable medium, such as, a CD, a DVD, a hard disc, a Blu-ray disc, a USB, a memory card, and a ROM.

While the present disclosure has been shown and described with reference to various exemplary embodiments, it will be understood by those skilled in the art that various changes in form and details may be made therein without departing from the spirit and scope of the present disclosure as defined by the appended claims and their equivalents.

What is claimed is:

1. A remote control apparatus for controlling a plurality of electronic apparatuses, the remote control apparatus comprising:
   an input interface;
   a communication interface;
   an infrared (IR) signal receiver; and
   a processor configured to:
      based on a predetermined event being detected, control the communication interface to transmit an operation preparation signal to the plurality of electronic apparatuses
      identify an electronic apparatus from among the plurality of electronic apparatuses based on an IR signal, from among a plurality of IR signals radiated by the plurality of electronic apparatuses, being received by the IR signal receiver, the IR signal being radiated by the electronic apparatus, and
      control the input interface to provide a user interface (UI) for controlling the electronic apparatus,
   wherein the electronic apparatus is present in an orientation direction of the remote control apparatus, and
   wherein the operation preparation signal controls the IR signal to be radiated by the electronic apparatus, from among the plurality of electronic apparatuses, at a predetermined interval.

2. The remote control apparatus as claimed in claim 1, wherein the IR signal receiver comprises a reflective surface having a parabolic shape, the IR signal receiver being configured to receive the IR signal incident on a focal point of the reflective surface from the electronic apparatus.

3. The remote control apparatus as claimed in claim 2, wherein the reflective surface comprises a non-reflective portion that is non-reflective to IR signals due to at least one from among a shape of the non-reflective portion, a material from which the non-reflective portion is constructed, and a material coating the non-reflective portion.

4. The remote control apparatus as claimed in claim 1, further comprising an IR signal transmitter,
   wherein the processor is further configured to:
      identify the electronic apparatus based on apparatus identification information included in the IR signal,
      control the input interface to provide a control command key set corresponding to the identified electronic apparatus, and
      based on a control command being input on the input interface, control the IR signal transmitter to transmit the control command to the identified electronic apparatus.

5. The remote control apparatus as claimed in claim 4, wherein the input interface further comprises:
   a touch display configured to receive a touch input,
   wherein the processor is further configured to control the touch display to display a graphical user interface (GUI) including the control command key set, and
   wherein the control command corresponds to a key of the control command key set for which the touch input is performed in the GUI.

6. The remote control apparatus as claimed in claim 4, wherein the input interface comprises at least one physical button, and
   wherein the processor is further configured to map the control command key set to the at least one physical button.

7. The remote control apparatus as claimed in claim 4, further comprising:
   a storage,
   wherein the processor is further configured to control the input interface to provide the control command key set corresponding to the identified electronic apparatus based on an IR code table stored in the storage, and
   wherein the IR code table comprises a plurality of control command key sets corresponding to identification information of the plurality of electronic apparatuses.

8. The remote control apparatus as claimed in claim 1, further comprising a motion sensor,
   wherein the processor is further configured to, based on a movement being sensed by the motion sensor, control the communication interface to transmit the operation preparation signal.

9. The remote control apparatus as claimed in claim 1, wherein the processor is further configured to control the communication interface to transmit, to the plurality of electronic apparatuses, a control command for controlling respective IR signal radiation periods of each of the plurality of electronic apparatuses based on at least one of a time of use of the plurality of electronic apparatuses or a frequency of use of each of the plurality of electronic apparatuses.

10. The remote control apparatus as claimed in claim 1, wherein the processor is further configured to control the communication interface to transmit, to the plurality of electronic apparatuses, a control command for controlling respective IR signal radiation periods of each of the plurality of electronic apparatuses.

11. A controlling method of a remote control apparatus for controlling a plurality of electronic apparatuses, the controlling method comprising:
   based on a predetermined event being detected, transmitting an operation preparation signal to the plurality of electronic apparatuses;
   receiving an infrared (IR) signal from among a plurality of IR signals radiated by the plurality of electronic apparatuses, the IR signal being radiated by an electronic apparatus, from among the plurality of electronic apparatuses;
   identifying the electronic apparatus from among the plurality of electronic apparatuses based on the IR signal; and
   providing a user interface (UI) for controlling the electronic apparatus,
   wherein the electronic apparatus is present in an orientation direction of the remote control apparatus, and
   wherein the operation preparation signal controls the IR signal to be radiated by the electronic apparatus, from among the plurality of electronic apparatuses, at a predetermined interval.

12. The controlling method of claim 11, wherein the remote control apparatus comprises a reflective surface having a parabolic shape, and
   wherein the IR signal is incident on a focal point of the reflective surface.

13. The controlling method of claim 11, wherein the identifying the electronic apparatus comprises identifying the electronic apparatus based on apparatus identification information included in the IR signal,
   wherein the providing the UI comprises providing a control command key set corresponding to the identified electronic apparatus, and
   wherein the controlling method, further comprises:
      receiving a control command corresponding to the control command key set, and
      transmitting the control command to the identified electronic apparatus.

14. The controlling method of claim 13, wherein the providing the UI comprises displaying, on a touch display, a graphical interface (GUI) including the control command key set, and wherein the control command corresponds to a key of the control command key set for which a touch input is performed in the GUI.

15. The controlling method of claim 13, wherein the control command key set is mapped to at least one physical button on the remote control apparatus.

16. The controlling method of claim 13, wherein the providing the control command key set comprises providing the control command key set based on a stored IR code table stored in the remote control apparatus, wherein the IR code table comprises a plurality of control command key sets corresponding to identification information of the plurality of electronic apparatuses.

17. The controlling method of claim 11, wherein the predetermined event comprises a predetermined movement of the remote control apparatus being sensed by a motion sensor.

18. The controlling method of claim 11, wherein the orientation direction comprises a direction in which the IR signal radiated by the electronic apparatus is incident on the remote control apparatus parallel to an axis of a reflective parabolic surface of the remote control apparatus.

19. The controlling method of claim 18, wherein the IR signal is incident parallel to the axis of the reflective parabolic surface when the IR signal is incident on the reflective parabolic surface within a predetermined angle of the axis.

\* \* \* \* \*